United States Patent [19]

Shobak

[11] Patent Number: 5,279,407
[45] Date of Patent: Jan. 18, 1994

[54] AUGER WEAR SHOE

[75] Inventor: Timothy G. Shobak, Bar Nunn, Wyo.

[73] Assignee: Wotco, Inc., Mills, Wyo.

[21] Appl. No.: 936,238

[22] Filed: Aug. 26, 1992

[51] Int. Cl.⁵ .............................................. B65G 33/26
[52] U.S. Cl. .................................................... 198/677
[58] Field of Search ........................ 198/664, 676, 677

[56] References Cited

U.S. PATENT DOCUMENTS

| | | |
|---|---|---|
| 2,610,739 | 9/1952 | Bitzer . |
| 3,197,895 | 8/1965 | Cooke . |
| 3,762,537 | 10/1973 | Lutz . |
| 3,764,062 | 10/1973 | Brautigam ........................... 198/676 |
| 3,994,084 | 11/1976 | Smith et al. . |
| 4,011,051 | 3/1977 | Helton et al. . |
| 4,328,925 | 5/1982 | Shapiro . |
| 4,519,496 | 5/1985 | Ludvigsen . |

Primary Examiner—Joseph E. Valenza
Attorney, Agent, or Firm—Klaas, Law, O'Meara & Malkin

[57] ABSTRACT

A wear shoe for an auger having a pair of spaced apart tapered openings extending therethrough is secured to an auger flight using a tapered nut having an axial extent as the tapered opening and dimensioned to fit into and contact each tapered opening to provide a substantially planar upper surface and a headed threaded bolt. The wear shoe has an arcuate recess formed in the upper surface thereof and a hardened member has an arcuate body portion secured in the arcuate recess.

16 Claims, 1 Drawing Sheet

AUGER WEAR SHOE

FIELD OF THE INVENTION

This invention relates generally to augers and more particularly to a replacement wear shoe for augers.

BACKGROUND OF THE INVENTION

It is common practice to replace wear shoes on augers. In one such practice, the wear shoe is replaced using a plow bolt. A pair of spaced apart openings are provided in the wear shoe and these openings have a tapered portion and a square portion. The wear shoe is attached by passing a plow bolt through each of the openings in the wear shoe and an opening in an auger flight and secured using a threaded nut. The plow bolt has a cylindrical threaded stem, a square portion, a conical portion and a rounded top. When installed, the plow bolt has an air space left at the rounded top and the upper surface of the wear shoe. This causes an interruption of the material flow in the area of the rounded top much like turbulent flow in water over a rough surface. With abrasive material, this results in a washing out effect behind the bolt that reduces the wear life of the wear shoe. Once the wear shoe has worn down to the rounded top, the wear rate is still uneven since the plow bolt is harder than the wear shoe. When the plow bolt wears down to the square portion, there is nothing to hold the wear shoe on the auger flight. This uneven wear also requires more torque to rotate the auger.

BRIEF DESCRIPTION OF THE INVENTION

This invention provides a wear shoe for an auger wherein the wear shoe and the means for securing it to the auger flight have similar wear characteristics and form a substantially planar surface.

In a preferred embodiment of the invention, there is provided a wear shoe having a base portion adapted to be secured to an auger flight and the base portion has upper and lower surfaces. A pair of spaced apart tapered openings extend through the wear shoe and have their smallest transverse cross-sectional area at the lower surface so as to be shaped similar to an inverted frustum of a cone. A tapered nut, also shaped similar to an inverted frustum of a cone, is dimensioned to fit in each of the openings of the wear shoe. The tapered nut has a central threaded opening extending therethrough. The tapered nut is formed from the same material as the wear shoe or from other materials having similar wear characteristics. The wear shoe is secured to an auger flight by passing a headed threaded bolt through an opening in an auger flight and in the wear shoe and threading it into the tapered nut. The headed threaded bolt is made from a material having wear characteristics similar to those of the tapered nut. The wear shoe also has an arcuate integral rim portion projecting downwardly from the base portion. An arcuate recess is formed in the upper surface of the base portion of the wear shoe adjacent to and over rim portion. A hardened member has an arcuate body portion that is dimensioned to fit into the arcuate recess and be secured thereto by suitable means, such as by welding. An arcuate rim portion projects downwardly from the arcuate body portion.

BRIEF DESCRIPTION OF THE DRAWING

An illustrative and presently preferred embodiment of the invention is shown in the drawing in which.

DETAILED DESCRIPTION OF THE INVENTION

Figure 1:
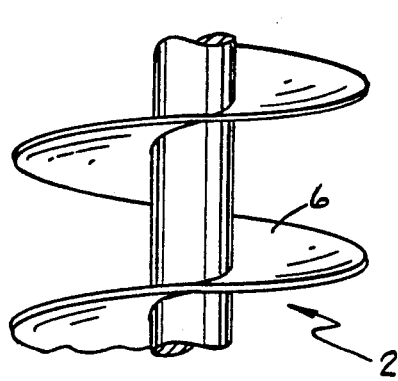
FIG. 1 is an elevational view of a portion of an auger of the prior art.
Figure 2:
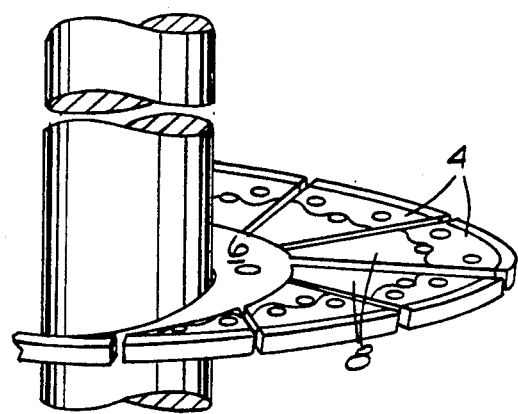
FIG. 2 is an enlarged portion of FIG. 1.
Figure 3:
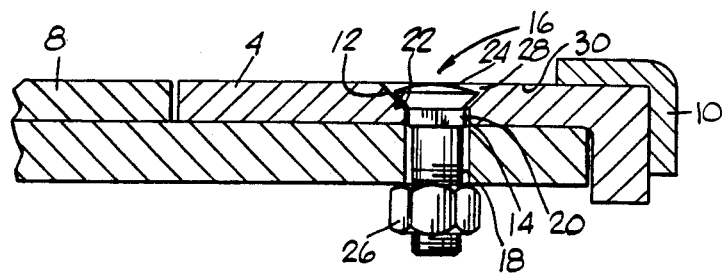
FIG. 3 is a view in cross-section showing one prior art method for attaching an auger wear shoe.

In FIG. 1, there is illustrated a portion of an auger 2 and in FIG. 2, there is illustrated wear shoes 4 attached to an auger flight 6. Wear plates 8 are welded onto the auger flight 6. The wear shoe 4 has a hardened member 10 attached thereto by suitable means, such as by welding. The wear shoe 4 has an opening extending therethrough and has a conical portion 12 and a square portion 14. A plow bolt 16 passes through the opening in the wear shoe 4 and an opening 18 in the auger flight 6. The plow bolt 16 has an externally threaded stem portion 18, a square portion 20, a conical portion 22 and a rounded top portion 24. An internally threaded nut 26 is threaded on the stem portion 18 and tightened to secure the wear shoe 4 on the auger flight 6. When the plow bolt 16 has been secured, there exist an air space 28 between the rounded top portion 24 and the upper surface 30 of the wear shoe 4. As described above, this causes an interruption of the material flow in the area of the rounded top portion 24 much like turbulent flow in water over a rough surface. With abrasive material, this results in a washing out effect behind the bolt that reduces the wear life of the wear shoe 4. Once the wear shoe 4 has worn down to the rounded top portion 24, the wear rate is still uneven since the plow bolt 16 is harder than the wear shoe 4. When the plow bolt 16 wears down to the square portion 20, there is nothing to hold the wear shoe 4 on the auger flight 6.

Figure 4:
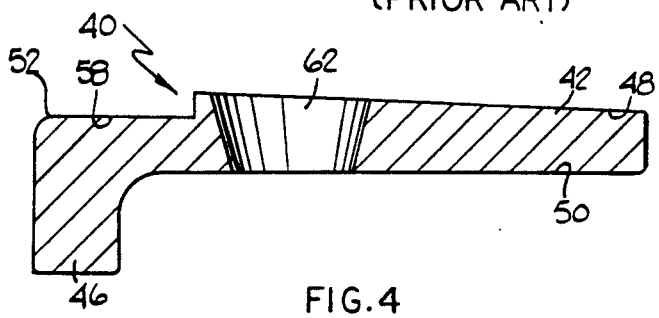
FIG. 4 is a view in cross-section illustrating wear shoe of this invention.
Figure 6:
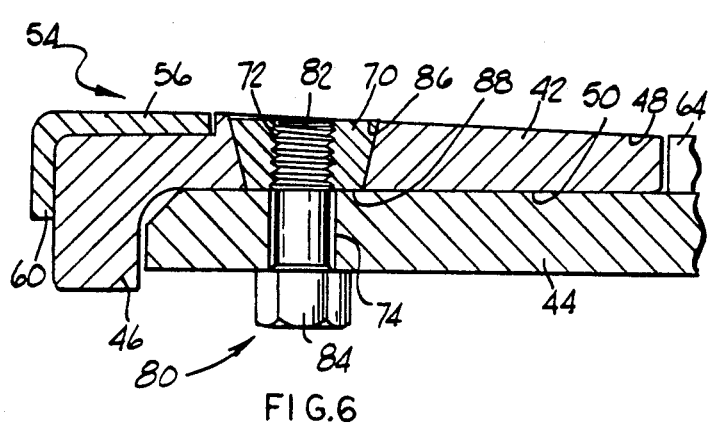
FIG. 6 is a cross-sectional view taken on the line 6—6 of FIG. 5.

In FIG. 4, there is illustrated a wear shoe 40 of this invention. The wear shoe 40 has a base portion 42 adapted to be secured to an auger flight 44. An integral arcuate rim portion 46 projects downwardly from the base portion 42. The base portion 42 has an upper surface 48 and a lower surface 50. As illustrated in FIGS. 4 and 6, the upper surface 48 is inclined relative to the lower surface 50 so that the radially outermost portion of the base portion 42 has an axial extent greater than the axial extent of the radially innermost portion of the base portion 42. An arcuate recess 52 is formed in the upper surface 48 and extends radially outwardly over the arcuate rim portion 46. A hardened member 54 has a body portion 56 which is secured to the upper surface 58 of the recess 52 by suitable means, such as by welding (not shown). As illustrated in FIG. 6, the body portion 56 has an upper surface 57 that lies substantially in the same plane as the radially outermost portion of the upper surface 42. Also, the upper surface 57 of the body portion 56 lies in a plane that is substantially parallel to the plane of the lower surface 50 of the base portion 42. An integral arcuate rim portion 60 projects downwardly from the body portion 56. A tapered opening 62 extends through the base portion 42 and has its smallest transverse cross-sectional configuration at the lower surface 50. The opening 62 has the shape generally of an inverted frustum of a cone. A wear plate 64 is secured to the auger flight 44 by suitable means, such as by welding (not shown).

Figure 5:
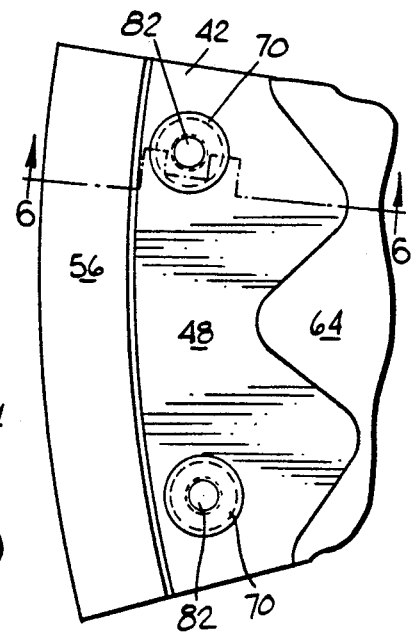
FIG. 5 is a top plan view of a portion of an auger flight having a wear shoe of this invention attached thereto.

The base portion 42 is secured to the auger flight 44 using a tapered nut 70. As illustrated in FIG. 5, there are two tapered openings 62 and two tapered nuts 70 for each base portion 42. The tapered nut 70 has a configuration that is generally that of an inverted frustum of a cone and is dimensioned to fit evenly into and contact the tapered opening 62. The tapered nut 70 has an internally threaded opening 72 extending therethrough. The wear shoe 40 and the tapered nut 70 are formed from the same material or from different materials provided that the different materials have similar wear characteristics. The wear shoe 40 and the tapered nut 70 are preferably formed from steel or other materials having similar wear characteristics. The base portion 42 is seated on the auger flight 44 so that the internally threaded opening 72 is aligned with an opening 74 extending through the auger flight 44. There are two such openings 74. The taper nut 70 and the tapered opening 62 have substantially the same axial extent.

The base portion 42 is secured to the auger flight 44 using a headed threaded bolt 80 having an externally threaded stem portion 82 and an enlarged head portion 84. The externally threaded stem portion 82 is passed through the opening 74 and is threaded into the internally threaded opening 72. The headed threaded bolt 80 is tightened and brings the outer surface of the taper nut 7 into tight engagement with the inner surface of the tapered opening 62. As illustrated in FIG. 6, when the base portion 42 is secured, the upper surface 86 of the tapered nut 70 is substantially planar with the upper surface 48 of the base portion 42 and the lower surface 88 is substantially planar with the lower surface 50 of the base portion 42. The headed threaded bolt 80 is formed from a material such as steel which has wear characteristics similar to the wear shoe 40 and the tapered nut 70.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A wear shoe for an auger flight comprising:
a base portion adapted to be secured to said auger flight and having upper and lower surfaces;
an integral rim portion projecting downwardly from said base portion;
at least one tapered opening extending therethrough and having its smallest transverse cross-sectional area at said lower surface;
at least one tapered nut located in and in contact with said at least one tapered opening and having its smallest transverse cross-sectional area at said lower surface;
said auger flight having an opening extending therethrough and aligned with said at least one tapered opening; and
a headed threaded bolt passing through said opening and in threaded engagement with said at least one tapered nut to secure said base portion to said auger flight.

2. A wear shoe as in claim 1 and further comprising;
a recess formed in said upper surface adjacent to and over said rim portion;
a hardened member having a body portion located in said recess and secured thereto; and
an integral rim portion projecting downwardly from said body portion of said hardened member.

3. A wear shoe as in claim 2 wherein:
said base portion and said tapered nut are formed from materials having similar wear characteristics.

4. A wear shoe as in claim 3 wherein:
said tapered nut has an upper surface lying substantially in the same plane as said upper surface of said base portion.

5. A wear shoe as in claim 4 wherein;
said recess and said base portion of said hardened member having a transverse cross-sectional configuration that is arcuate.

6. A wear shoe as in claim 1 wherein:
said base portion and said tapered nut are formed from the same material.

7. A wear shoe as in claim 6 wherein:
said tapered nut has an upper surface lying substantially in the same plane as said upper surface of said base portion and a lower surface lying substantially in the same plane as said lower surface of said base portion.

8. A wear shoe as in claim 7 wherein:
said recess and said base portion of said hardened member having a transverse cross-sectional configuration that is arcuate.

9. A wear shoe as in claim 1 wherein:
said tapered nut has an upper surface lying substantially in the same plane as said upper surface of said base portion and a lower surface lying substantially in the same plane as said lower surface of said base portion.

10. A wear shoe as in claim 1 wherein:
a recess formed in said upper surface adjacent to and over said rim portion;
a hardened member having a base portion located in said recess and secured thereto; and
an integral rim portion projecting downwardly from said base portion of said hardened member;
said recess and said base portion of said hardened member having a transverse cross-sectional configuration that is arcuate.

11. A wear shoe as in claim 1 wherein:
said tapered nut has an axial extent that is substantially the same as the axial extent of said tapered opening.

12. A wear shoe as in claim 11 wherein:
said base portion and said tapered nut are formed from materials having similar wear characteristics.

13. A wear shoe as in claim 12 wherein:
said tapered nut has an upper surface lying substantially in the same plane as said upper surface of said base portion.

14. A wear shoe as in claim 13 and further comprising:
a recess formed in said upper surface adjacent to and over said rim portion;
a hardened member having a base portion located in said recess and secured thereto; and
an integral rim portion projecting downwardly from said base portion of said hardened member.

15. A wear shoe as in claim 14 wherein:
said recess and said base portion of said hardened member having a transverse cross-sectional configuration that is arcuate.

16. A wear shoe as in claim 15 wherein:
said tapered nut has a lower surface lying in substantially the same plane as said lower surface of said base portion.

* * * * *